May 24, 1932. G. BERNERT 1,860,127
PNEUMATIC CONVEYING APPARATUS
Filed Jan. 27, 1927   2 Sheets-Sheet 1

Inventor
George Bernert
By Ira Milton Jones
Attorneys

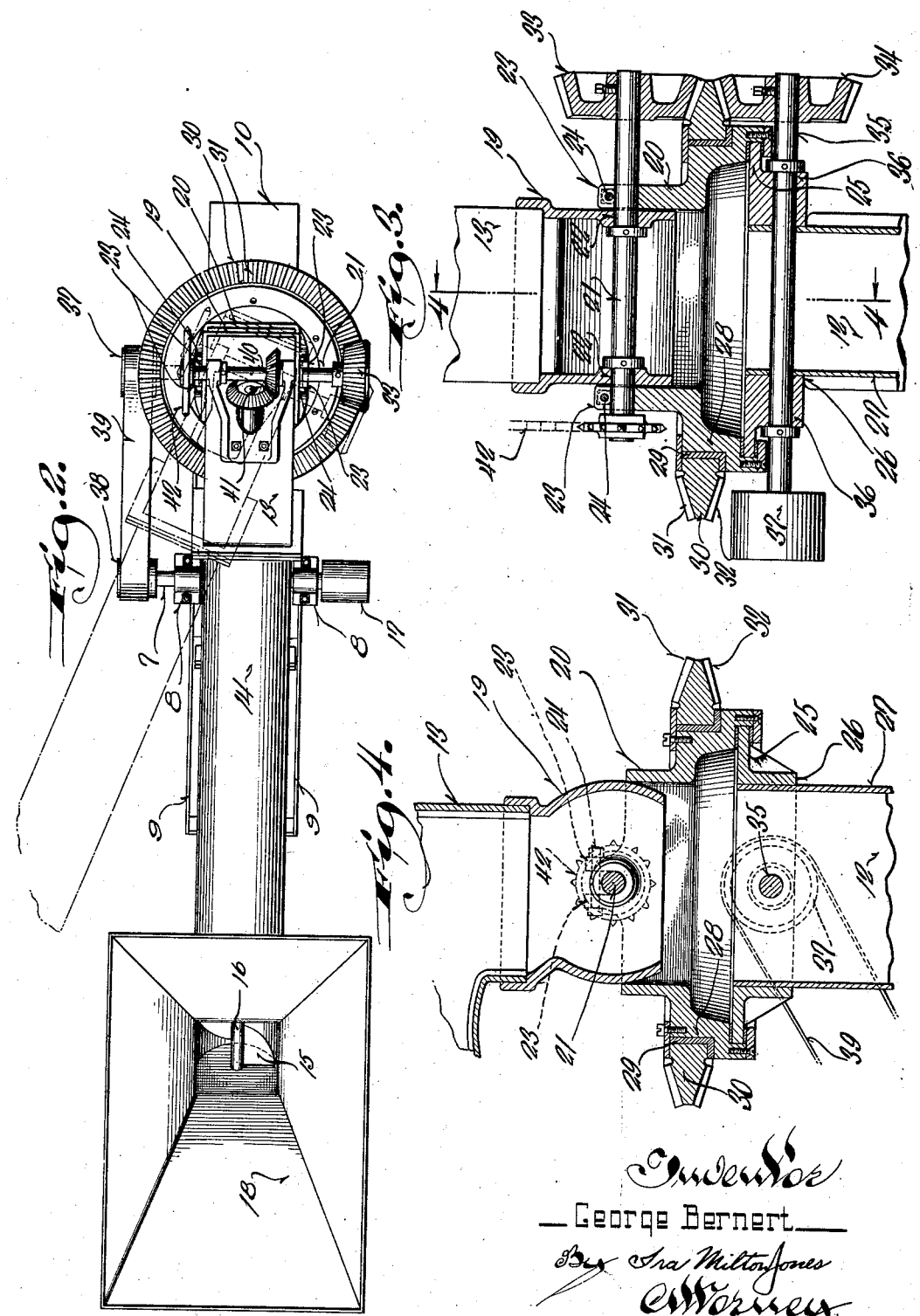

Patented May 24, 1932

1,860,127

UNITED STATES PATENT OFFICE

GEORGE BERNERT, OF MILWAUKEE, WISCONSIN

PNEUMATIC CONVEYING APPARATUS

Application filed January 27, 1927. Serial No. 164,005.

This invention relates to certain new and useful improvements in pneumatic conveying apparatus of the type embodying a mechanical conveyer for receiving material to be conveyed and discharging the same into a duct through which it is carried to a point of discharge by a pressure current of air therein.

In conveyers of this type, it is frequently desirable that the receiving hopper of the mechanical conveyer be shifted through a horizontal and a vertical plane without disturbing the blower mechanism and the conveying duct leading therefrom, and this invention has as an object the provision of an improved conveyer of the character described having provisions whereby the material receiving hopper may be moved to various positions of adjustment without disturbing the conveying mechanism proper.

Another object of this invention resides in the provision of an improved pneumatic conveyer apparatus including a casing having a mechanical conveying mechanism therein for conveying materials from a receiving hopper to the pneumatic conveying duct which mechanical conveying casing has a substantially universal connection with the pneumatic duct to permit its movement without disturbing the drive of the mechanical conveyer.

And a still further object of this invention resides in the provision of an improved pneumatic conveyer of the character described in which the mechanical conveyer casing is swingingly connected with the pneumatic conveying duct and the drive of the mechanical conveying means obtained from the blower fan through a drive connection disposed adjacent the adjustable connection of the conveyer casing and the pneumatic conveying duct.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 2 is a top plan view thereof;

Figure 3 is an enlarged detailed view taken through the swivel connection between the mechanical conveyer casing and the pneumatic conveying duct on the plane of the line 3—3 of Figure 1, and Figure 4 is a view similar to Figure 3 taken therethrough on the line 4—4.

Figure 1:
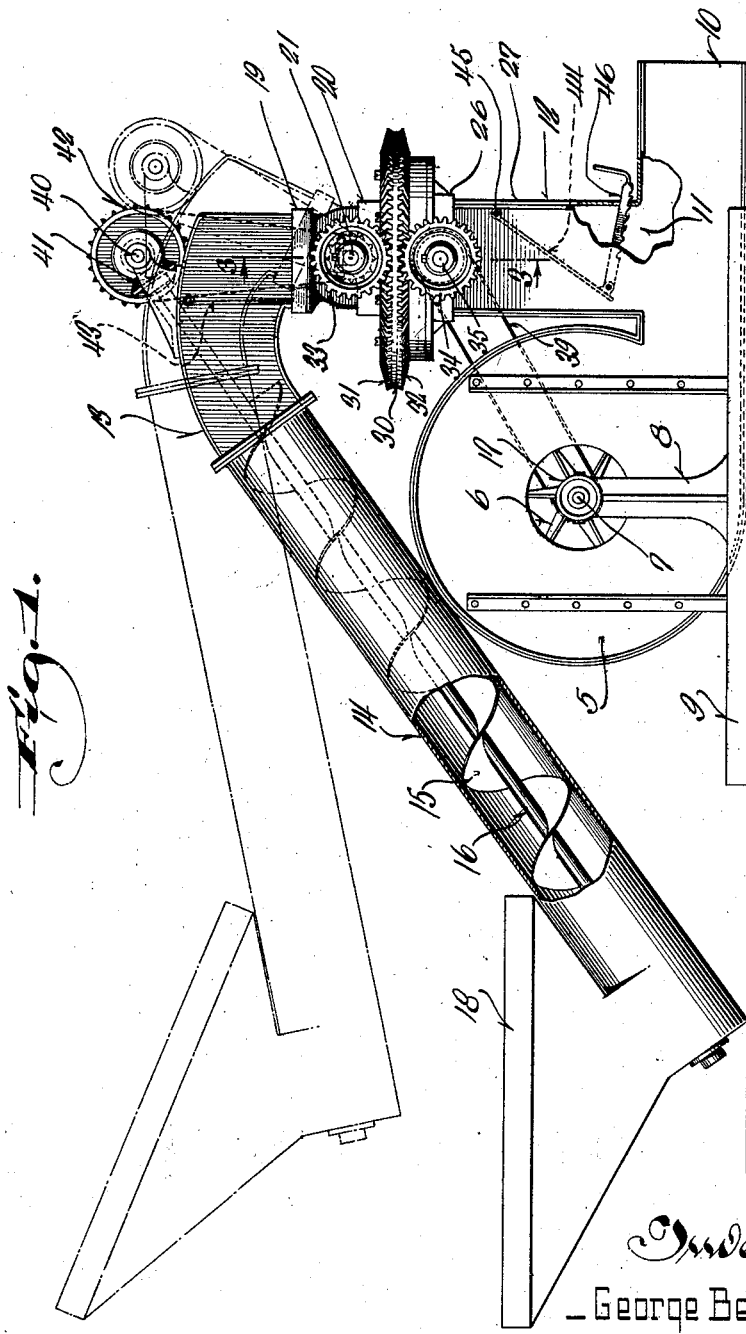
Figure 1 is a side view, partly in section, and partly in elevation, of a pneumatic conveyer embodying my invention.

Referring now more particularly to the accompanying drawings, in which like numerals designate like parts throughout the several views, 5 designates a fan casing having a blower 6 therein, the shaft 7 of which is journaled in standards 8 mounted on a base 9 at opposite sides of the casing. A conveying air duct or trunk 10 has its inner end in communication with the fan casing from which it extends to a suitable point of discharge, not shown, and is provided with an opening 11 in its top wall at a point adjacent its connection with the fan casing with which a discharge chamber 12 communicates, the discharge chamber being connected with the discharge end 13 of a mechanical conveyer casing 14, in the manner later described.

A mechanical conveyer 15, illustrated in the present instance as of the screw type, is mounted within the casing 14 and has its shaft 16 drivingly connected with the shaft 7 of the blower or fan so that the power of a prime mover, not shown, connected with the shaft 7 through a belt pulley 17 likewise actuates the mechanical conveyer. A receiving hopper 18 is connected with the lower or receiving end of the casing 14 and the materials to be conveyed are dumped or otherwise discharged into the hopper 18, picked up by the mechanical conveyer and elevated through the casing 14 to enter the duct 10 through the discharge chamber 12 wherein it is conveyed by the pressure current of air created by the fan.

It is frequently desirable to shift the hopper 18 and, heretofore, this has been accomplished only by shifting the entire unit, thus necessitating rearrangement of the conveying duct 10 extending therefrom and this invention contemplates the provision of novel means interposed between the discharge end of the mechanical conveyer casing and the duct 10 whereby the casing 14 may be swung both vertically and laterally with respect to the chamber 12, the movement or adjustment of the casing 14 at no time disturbing the drive of the mechanical conveyer 15.

The discharge end 13 of the casing 14 is of approximately elbow shape and has a swivel member 19 fixed thereto which is pivotally secured within a socket member 20 on the axis of a shaft 21 to permit the vertical movement of the outer or lower end of the casing 14, the shaft 21 passing through bearing portions 22 in the swivel member 19 and through pairs of spaced lugs 23 in the socket member in which it is secured to retain the member 19 in place, by pins or other means 24 closing the spaces between the ends of the lugs. The socket member 20 is rotatably secured to an annular flange 25 formed on a collar or sleeve 26 fixed on the upper end of a casing 27 which, with the members 19 and 20 form the chamber 12, the member 20 being rotatable with respect to the casing 27 permits movement of the casing 14 about the axis of the casing 27, and the member 19 being swiveled on the axis of the shaft 21 permits the elevation of the outer end of the casing 14.

An intermediate collar 28 is formed on the member 20 and has a bearing bushing 29 secured thereabout to provide a journal for a ring gear 30, the opposite faces of which are provided with gear teeth 31 and 32 with which pinion gears 33 and 34 mesh, the gear 33 being fixed to the adjacent end of the shaft 21 and the gear 34 being secured to the adjacent end of a shaft 35 traversing the chamber 12 parallel to the shaft 21 and journaled in bearing portions 36 formed at the lower portion of the collar 26. The end of the shaft 35 remote from the gear 34 has a pulley 37 fixed thereon which is connected with a pulley 38 fixed to the blower shaft 7 by a belt 39 and the end of a shaft 21 opposite the gear 33 is connected with a counter-shaft 40 drivingly connected through a bevel gear connection 41 with the mechanical conveyer by means of a sprocket chain arrangement 42 whereby the mechanical conveyer is driven from the blower shaft through the ring gear 30.

As will be readily apparent, rotation of the member 20 with respect to the casing 27 by the sidewise movement of the conveyer casing 14 in no wise disturbs the drive connection of the gears 33 and 34 with the ring gears 30 and thus permits the uninterrupted operation of the mechanical conveyer and likewise the elevation of the outer end of the casing 14 does not disturb the drive of the mechanical conveyer as the same pivots on the shaft 21 which is directly connected with the countershaft 40 fixed on the discharge end of the casing, as clearly shown in Figures 1 and 2.

When the conveyer casing 14 is arranged in longitudinal alignment with the pneumatic duct and blower, as depicted in Figure 1, the material being fed by the mechanical conveyer 15 enters the chamber 12 in a relatively thin layer, substantially covering the wall with which the free end of a flap valve 43 cooperates, thus entering the conveying current of air in the duct 10, transversely, i. e., covering substantially the width of the duct. However, when the casing 14 is swung to a position at right angles to the blower and the duct 10, the material being fed thereby has a tendency to follow the side wall of the chamber and enters the duct 10 on one side only, thereby utilizing only part of the pressure current of air.

To prevent this a deflector plate 44 is positioned within the casing 27, which has its upper end hingedly connected thereto, as at 45, and its lower or free end adjustably held in position by a toothed adjusting lever 46. Thus it will be seen that regardless of the angle at which the casing 14 has been placed, with respect to the duct and blower, the material at all times enters the duct 10 in its proper manner covering substantially the entire width of the pressure current of air.

From the foregoing description taken in connection with the accompanying drawings, it will be readily apparent to those skilled in the art to which an invention of the character described appertains that I provide a novel and improved means for connecting the mechanical conveying casing with the pneumatic conveying duct whereby the same has a substantially universal connection therewith to permit the adjustment of its material receiving end without in any wise disturbing the drive of the mechanical conveyer.

What I claim as my invention is:

1. In a pneumatic conveyer including a conveying duct, means for procuring a pressure current of air therein, a receiving casing connected with the duct, a mechanical conveyer in the casing and means for driving the mechanical conveyer, a second casing extended from the conveying duct, a swivel member carried by the receiving casing, a socket member rotatably mounted on the second casing to pivotally mount the swivel member whereby the receiving casing is substantially universally pivotally connected with the second casing for movement without disturbing the drive of the mechanical conveyer.

2. In a pneumatic conveyer including a conveyer duct, blower means for procuring a pressure current of air therein and having a drive shaft, a receiving casing and a mechanical conveyer in the casing, a second casing extended from the duct, a sleeve member carried thereby, a socket member rotatably mounted on the sleeve member, a swivel member carried by the receiving casing, a shaft mounted in the swivel member and journaled in the socket member whereby the receiver casing may be moved about the axis of said shaft, and drive means for the mechanical conveyer.

3. In a pneumatic conveyer including a conveyer duct, blower means for procuring a pressure current of air therein and having a drive shaft, a receiving casing and a mechanical conveyer in the casing, a second casing extended from the duct, a sleeve member carried thereby, a socket member rotatably mounted on the sleeve member, a swivel member carried by the receiving casing, a shaft mounted in the swivel member and journaled in the socket member whereby the receiver casing may be moved about the axis of said shaft, and drive means for the mechanical conveyer including a ring gear journaled on the socket member, a pinion meshing therewith, means for driving the pinion from the drive shaft of the blower means to drive the ring gear, a second pinion carried by the swivel member shaft and meshing with the ring gear and driven thereby, and means for drivingly connecting said shaft with the mechanical conveyer.

4. In a pneumatic conveyor including a conveying duct, means for procuring a pressure current of air therein and a closed casing, a mechanical conveyor in the casing, closed means connecting the casing with the duct to form an enclosed path for material passing from the casing to the duct, said means being movable to accommodate movement of the casing with respect to the duct about two axes disposed at substantially right angles to each other, and means for driving the mechanical conveyer including a driven shaft rotatable but otherwise fixed with respect to the conveying duct and meshed gears driven from said shaft and rotatable—one about each of said axes.

5. In a pneumatic conveyor having a conveyor duct, means for procuring a pressure current of air therein, a branch extended from the duct and in communication therewith, a closed receiving casing, means connecting the receiving casing with the branch duct to support one end thereof, said means accommodating movement of the casing with respect to the branch and the duct about two axes arranged at substantially right angles to each other, and with the closed receiving casing forming an enclosed path for material to be conducted to the duct through the branch, a mechanical conveyor in the receiving casing for conveying the material along said path, and means for driving the mechanical conveyer including a gear rotatable about one of said axes and a gear meshed therewith and rotatable about the other of said axes.

6. In a pneumatic conveyer including a conveying duct, means for procuring a pressure current of air therein, a receiving casing connected with the duct, a mechanical conveyer in the receiving casing and means for driving the mechanical conveyer, a swivel member carried by the receiving casing, a socket member rotatably mounted from the conveying duct to pivotally mount the swivel member whereby the receiving casing is substantially universally pivotally connected with the conveying duct while maintaining the drive for the mechanical conveyer.

7. In a pneumatic conveyer including a conveying duct, a blower for procuring a pressure current of air therein, a closed receiving casing and a mechanical conveyer in the receiving casing, closed means connecting the receiving casing with the duct to form an enclosed path for material passing from the receiving casing to the duct, said means being movable to accommodate movement of the casing with respect to the duct about two axes disposed at substantially right angles to each other, and means for driving the mechanical conveyer from the blower comprising a ring gear rotatable about one of said axes, a drive connection between the ring gear and the blower, a gear meshed with the ring gear and rotatable about the other of said axes, and a drive connection between said last-mentioned gear and the mechanical conveyer.

In testimony whereof I hereunto affix my signature.

GEORGE BERNERT.